United States Patent
Kim et al.

(10) Patent No.: US 10,778,917 B2
(45) Date of Patent: Sep. 15, 2020

(54) JOINT DICTIONARY GENERATION METHOD FOR IMAGE PROCESSING, INTERLACE-BASED HIGH DYNAMIC RANGE IMAGING APPARATUS USING JOINT DICTIONARIES AND IMAGE PROCESSING METHOD OF THE SAME

(71) Applicants: SK hynix Inc., Gyeonggi-do (KR); KOREA ADVANCED INSTITUTE OF SCIENCE AND TECHNOLOGY, Daejeon (KR)

(72) Inventors: Min Hyuk Kim, Daejeon-si (KR); Inchang Choi, Daejeon-si (KR)

(73) Assignees: SK hynix Inc., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 147 days.

(21) Appl. No.: 15/980,456

(22) Filed: May 15, 2018

(65) Prior Publication Data
US 2019/0199948 A1    Jun. 27, 2019

(30) Foreign Application Priority Data
Dec. 26, 2017   (KR) .................. 10-2017-0179052

(51) Int. Cl.
*H04N 5/359*   (2011.01)
*H04N 5/232*   (2006.01)
(Continued)

(52) U.S. Cl.
CPC .......... *H04N 5/3597* (2013.01); *G06T 5/009* (2013.01); *H04N 5/2353* (2013.01);
(Continued)

(58) Field of Classification Search
None
See application file for complete search history.

(56) References Cited

U.S. PATENT DOCUMENTS 9,225,889 B1 * 12/2015 Korkin ............... H04N 5/2258
10,499,069 B2 * 12/2019 Wang .................. H04N 19/177
(Continued)

FOREIGN PATENT DOCUMENTS

KR    1020170096492    8/2017

OTHER PUBLICATIONS

Jianchao Yang, J. Wright, T. Huang and Yi Ma, "Image super-resolution as sparse representation of raw image patches", IEEE Conf. on Computer Vision and Pattern Recognition, CVPR., pp. 1-8, 2008. ISSN 1063-6919 (Year: 2008).*

*Primary Examiner* — Iman K Kholdebarin
(74) *Attorney, Agent, or Firm* — IP & T Group LLP (57) ABSTRACT

An HDR imaging apparatus include: a deinterlacing circuit configured to generate a high-exposure Bayer frame and low-exposure Bayer frame by deinterlacing an interlace Bayer raw frame in which a high-exposure region and low-exposure region are interlaced; a demosaicing circuit configured to convert the high-exposure Bayer frame and the low-exposure Bayer frame into a high-exposure RGB frame and low-exposure RGB frame, respectively; a reconstructing circuit configured to remove interlace artifacts and noise from the high-exposure RGB frame and the low-exposure RGB frame, using joint dictionaries generated through joint dictionary learning on training data sets each containing a plurality of bases, but the corresponding bases have different values; and an HDR generation circuit configured to generate an HDR image frame by combining the high-exposure RGB frame and the low-exposure RGB frame from which interlace artifacts and noise were removed by the reconstructing circuit.

21 Claims, 7 Drawing Sheets

(51) Int. Cl.
*H04N 9/64* (2006.01)
*H04N 5/235* (2006.01)
*G06T 5/00* (2006.01)

(52) U.S. Cl.
CPC ......... *H04N 5/23232* (2013.01); *H04N 9/646* (2013.01); *G06T 2207/20208* (2013.01)

(56) References Cited

U.S. PATENT DOCUMENTS

| | | | | |
|---|---|---|---|---|
| 2002/0149703 | A1* | 10/2002 | Adams | H04N 7/012 348/700 |
| 2005/0264693 | A1* | 12/2005 | Kondo | H04N 21/485 348/458 |
| 2010/0085475 | A1* | 4/2010 | Madnani | H04N 5/145 348/448 |
| 2010/0103297 | A1* | 4/2010 | Motomura | H04N 5/23232 348/294 |
| 2011/0211099 | A1* | 9/2011 | Nayar | H04N 9/045 348/278 |
| 2013/0076823 | A1* | 3/2013 | Nomura | B41J 2/2146 347/14 |
| 2015/0199792 | A1* | 7/2015 | Pavani | H04N 5/23232 382/254 |
| 2015/0215529 | A1* | 7/2015 | Wang | G06K 9/6244 348/218.1 |
| 2015/0268392 | A1* | 9/2015 | Kobayashi | H04N 13/232 348/336 |
| 2015/0363914 | A1* | 12/2015 | Boyle | B60R 1/00 345/629 |
| 2016/0065824 | A1* | 3/2016 | Geng | H04N 5/3591 348/222.1 |
| 2016/0078600 | A1* | 3/2016 | Perez Pellitero | G06T 7/60 382/155 |
| 2016/0165178 | A1* | 6/2016 | al-Salem | G06T 5/003 348/441 |
| 2019/0195690 | A1* | 6/2019 | Ben-Shahar | G01J 3/2823 |

* cited by examiner

JOINT DICTIONARY GENERATION METHOD FOR IMAGE PROCESSING, INTERLACE-BASED HIGH DYNAMIC RANGE IMAGING APPARATUS USING JOINT DICTIONARIES AND IMAGE PROCESSING METHOD OF THE SAME

CROSS-REFERENCE TO RELATED APPLICATIONS

The present application claims priority of Korean Patent Application No. 10-2017-0179052, filed on Dec. 26, 2017, which is incorporated herein by reference in its entirety.

BACKGROUND

1. Field

Exemplary embodiments of the present invention relate to an HDR (High Dynamic Range) imaging apparatus, and more particularly, to an imaging apparatus capable of maximizing the quality of an interlace-based HDR image using joint dictionaries generated through joint dictionary learning, and an image processing method thereof.

2. Description of the Related Art

HDR imaging is a technique for precisely analyzing light and shadow, and showing a natural image in a similar manner to the human eye.

In order to acquire an HDR image, a plurality of images captured at different exposures are needed. As for the method for acquiring a plurality of images with different exposures, a method for consecutively capturing a plurality of images with different exposure settings has been generally used. In this case, however, since the images are captured at different times, a problem referred to as "ghost effect" may occur in an HDR image in which motions of an object are synthesized.

In order to overcome such a problem, interlace-based HDR imaging has been proposed. An interlace-based sensor can set different exposure times or gains to odd macro rows and even macro rows, in order to capture an image.

When the interlace-based sensor is used, two images captured at different exposures at the same time can be generated through one capture. Therefore, the ghost effect can be reduced. However, a spatial resolution problem may occur while the vertical resolution of each image is reduced to half.

Furthermore, when the gain of each macro row is adjusted to change the exposure, severe noise may be caused in a macro row set at a high gain. In particular, such a noise problem becomes more serious in a dark area of a scene.

RELATED ART DOCUMENT

Patent Document

Patent Document 1: Korean Patent Publication No. 10-2017-0096492 (Aug. 24, 2017)
Patent Document 2: US Patent Publication No. 2005-024693 (Dec. 1, 2005)

SUMMARY

Various embodiments are directed to a joint dictionary generation method capable of maximizing the quality of an HDR image by solving resolution and noise problems which may occur while processing an interlace-based HDR image, an HDR imaging apparatus using joint dictionaries generated through the joint dictionary generation method, and an image processing method thereof.

In an embodiment, a joint dictionary generation method for image processing may include: receiving first data as a set of first bases with a high resolution; receiving second data as a set of second bases with a low resolution; and generating a high-quality joint dictionary and low-quality joint dictionary which share a specific sparse code, by performing sparse coding on the first and second data. The first bases and the second bases may correspond one-to-one to each other.

In an embodiment, an HDR imaging apparatus may include: a reconstructing circuit configured to remove interlace artifacts and noise from a high-exposure RGB frame and a low-exposure RGB frame, using joint dictionaries generated through joint dictionary learning on training data sets each containing a plurality of bases, wherein the plurality of bases of one training data set correspond one-to-one to those of the other training data set, but the corresponding bases have different values; and an HDR generation circuit configured to generate an HDR image frame by combining the high-exposure RGB frame and the low-exposure RGB frame from which interlace artifacts and noise were removed by the reconstructing circuit.

In an embodiment, an HDR image processing method may include: removing interlace artifacts and noise from a high-exposure RGB frame and a low-exposure RGB frame, by using joint dictionaries generated through joint dictionary learning on training data sets each containing a plurality of bases, wherein the plurality of bases of one training data set correspond one-to-one to those of the other training data set, but the corresponding bases have different values; and generating an HDR image frame by combining the high-exposure RGB frame and the low-exposure RGB frame from which interlace artifacts and noise are removed.

These and other features and advantages of the present invention will become apparent to those with ordinary skill in the art to which the present invention belongs from the following description in conjunction with the accompanying drawings.

DETAILED DESCRIPTION

Various embodiments will be described below in more detail with reference to the accompanying drawings. The present invention may be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Moreover, detailed descriptions related to well-known functions or configurations will be ruled out in order not to unnecessarily obscure subject matters of the present invention.

The terms such as first and second may be used to describe various components, but the components are not limited by the terms, and the terms are used only to distinguish one component from another component.

Figure 1:
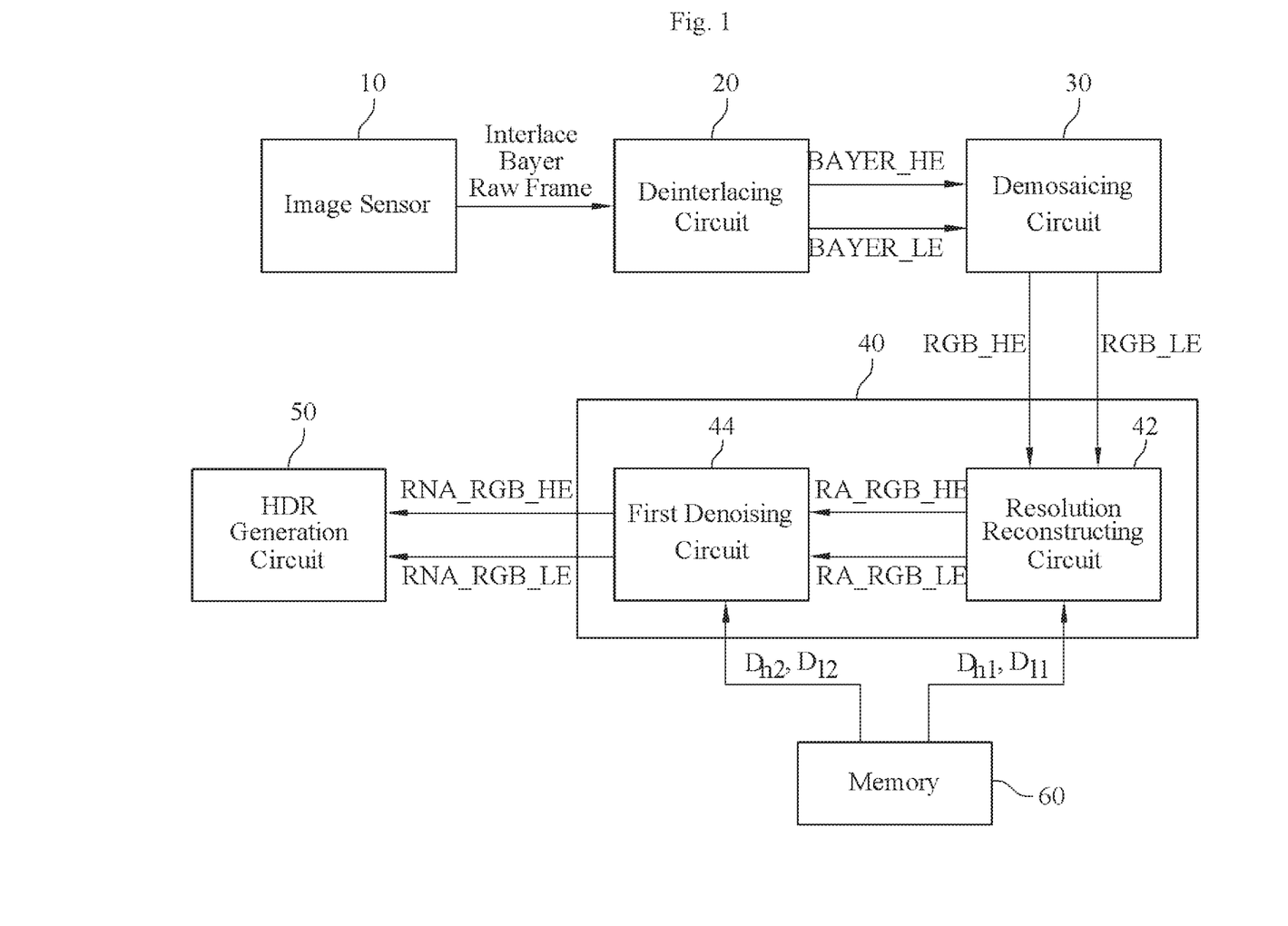
FIG. 1 illustrates a configuration of an interlace-based HDR imaging apparatus in accordance with an embodiment.

FIG. 1 illustrates a configuration of an interlace-based HDR imaging apparatus in accordance with an embodiment.

The interlace-based HDR imaging apparatus of FIG. 1 may include an image sensor 10, a deinterlacing circuit 20, a demosaicing circuit 30, a reconstructing circuit 40, an HDR generation circuit 50 and a memory 60.

Figure 2:
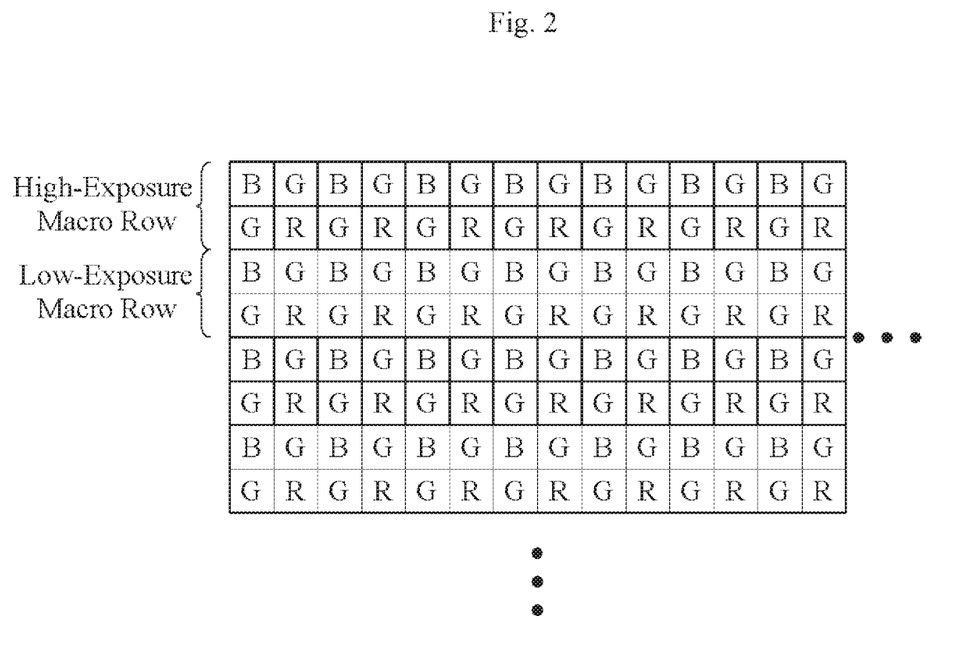
FIG. 2 illustrates an interlaced raw input image signal captured by an image sensor.

The image sensor 10 senses the intensity and color of an optical image, converts the optical image into image data, and generates and outputs an image frame. In particular, the image sensor 10 in accordance with the present embodiment sets different exposure times or gains to odd macro rows and even macro rows of a frame, and captures an image of an object to generate a raw input image signal including both of a high-exposure region and low-exposure region in one image frame. The raw input image signal is hereafter referred to as an interlace Bayer raw frame. For example, as illustrated in FIG. 2, the image sensor 10 may generate an interlace Bayer raw frame in which an odd macro row is set to a high exposure row and an even macro row is a low exposure row. In this case, the macro row indicates two consecutive sensor lines, and includes a consecutive arrangement of square-shaped BGGR (or RGGB) pixels constituting a Bayer pattern. The image sensor 10 may include a CIS (CMOS Image Sensor).

Figure 3:
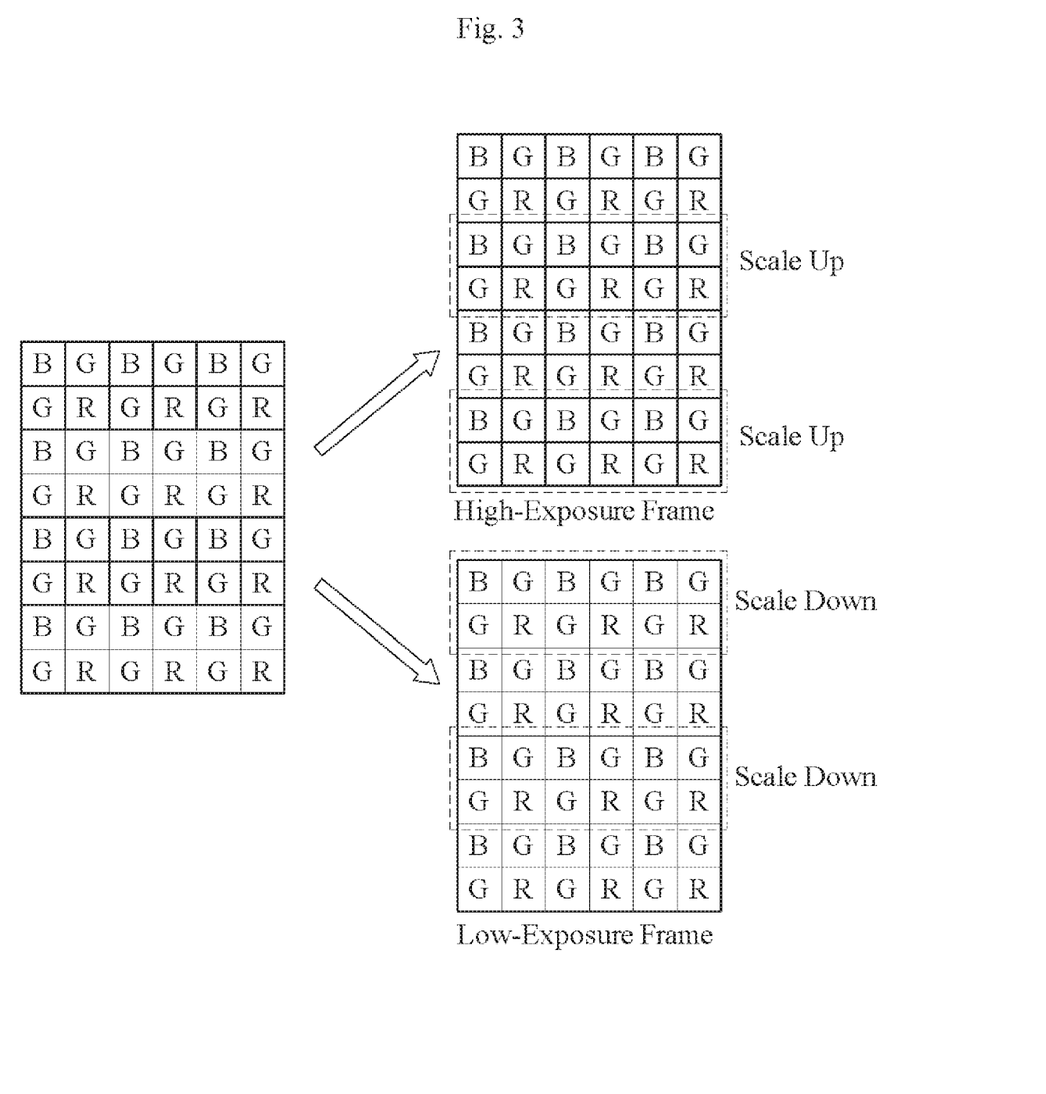
FIG. 3 illustrates a process of deinterlacing the interlaced raw input image signal of FIG. 2.

The deinterlacing circuit 20 extracts a high-exposure Bayer frame BAYER_HE and a low-exposure Bayer frame BAYER_LE using the interlace Bayer raw frame outputted from the image sensor 10. For example, the deinterlacing circuit 20 detects high-exposure regions and low-exposure regions in the interlace Bayer raw frame, using a preset reference value (threshold value). Then, as illustrated in FIG. 3, the deinterlacing circuit 20 may scale up the low-exposure regions or multiply the low-exposure regions by a preset gain value such that the entire frame becomes high-exposure regions, in order to extract the high-exposure Bayer frame BAYER_HE. Furthermore, the deinterlacing circuit 20 may scale down the high-exposure regions or divide the high-exposure regions by a preset gain value such that the entire frame becomes low-exposure regions, in order to extract the low-exposure Bayer frame BAYER_LE. When there is an over-exposed macro row, the deinterlacing circuit 20 can extract the low-exposure Bayer frame BAYER_LE by copying an adjacent low-exposure macro row to the over-exposed macro row, and extract the high-exposure Bayer frame BAYER_HE by performing the same copying operation as the low-exposure frame extraction and scaling up low-exposure regions.

The demosaicing circuit 30 converts the deinterlaced high-exposure Bayer frame BAYER_HE and the deinterlaced low-exposure Bayer frame BAYER_LE into RGB frames by applying a demosaicing process to the Bayer frames. For example, the demosaicing circuit 30 generates a high-exposure RGB frame RGB_HE and a low-exposure RGB frame RGB_LE by converting Bayer patterns (BGGR pixels) contained in the deinterlaced high-exposure Bayer frame BAYER_HE and the deinterlaced low-exposure Bayer frame BAYER_LE into sets of red, green and blue values. The demosaicing process may include a variety of algorithms. In the present embodiment, any one of various conventional algorithms may be selected to perform demosaicing. Therefore, the descriptions of the demosaicing process are omitted in the present embodiment. White balance between RGB channels in the RGB frames (images) generated through the conversion may not be achieved. Therefore, white balancing may be additionally performed on the demosaiced frames RGB_HE and RGB_LE, using camera characteristic information acquired through a test and calibration which have been performed in advance. The white balancing may be performed by the demosaicing circuit 30, and a separate component for white balancing may be added to an output terminal of the demosaicing circuit 30. As for the white balancing, any one of conventional methods may be selectively used.

The reconstructing circuit 40 removes interlace artifacts and noise from the high-exposure RGB frame RGB_HE and the low-exposure RGB frame RGB_LE which are outputted from the demosaicing circuit 30, using joint dictionaries $D_{h1}$, $D_{l1}$, $D_{h2}$ and $D_{l2}$ generated through joint dictionary learning on a training data set. The reconstructing circuit 40 may include a resolution reconstructing circuit 42 and a first denoising circuit 44. The resolution reconstructing circuit 42 removes the interlace artifacts from the high-exposure RGB frame RGB_HE and the low-exposure RGB frame RGB_LE outputted from the demosaicing circuit 30, using the high-exposure joint dictionary $D_{h1}$ and the low-exposure joint dictionary $D_{l1}$ which share a sparse code $\alpha_1$. That is, the resolution reconstructing circuit 42 removes the interlace artifacts using the joint dictionaries $D_{h1}$ and $D_{l1}$. The interlace artifacts are typically generated while the interfaced frames are deinterlaced. The first denoising circuit 44 removes the noise contained in the high-exposure RGB frame RA_RGB_HE and the low-exposure RGB frame RA_RGB_LE outputted from the resolution reconstructing circuit 42, using the low-noise joint dictionary $D_{h2}$ and the high-noise joint dictionary $D_{l2}$ which share a sparse code $\alpha_2$.

An exemplary method for generating joint dictionaries using joint dictionary learning and the method for removing interlace artifacts and noise using the joint dictionaries will be described later.

The HDR generation circuit 50 generates an HDR image frame by combining the RGB frames outputted from the first denoising circuit 44, that is, the high-exposure RGB frame RNA_RGB_HE and the low-exposure RGB frame RNA_RGB_LE from which the interlace artifacts and noise are removed. As for the method for generating an HDR image frame, any one method of various existing methods may be used.

The memory 60 stores the joint dictionaries $D_{h1}$, $D_{h2}$, $D_{l1}$ and $D_{l2}$ which are generated through joint dictionary learning in advance. That is, the memory 60 stores the joint dictionaries $D_{h1}$ and $D_{l1}$ for removing interface artifacts and the joint dictionaries $D_{h2}$ and $D_{l2}$ for removing noise.

Figure 4:
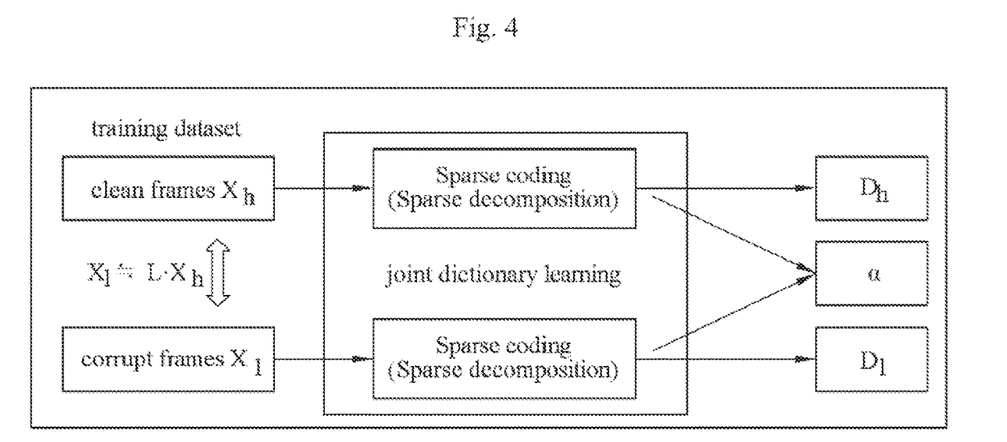
FIG. 4 is a diagram for describing a method for acquiring joint dictionaries through joint dictionary learning in accordance with an embodiment.

FIG. 4 is a diagram for describing the method for acquiring joint dictionaries through joint dictionary learning in accordance with the embodiment.

First, a sparse linear model and sparse decomposition will be described as follows.

When it is assumed that x represents a signal belonging to $R^m$, the sparse linear model can express the signal x using a dictionary D as a certain new basis and a sparse coefficient (or sparse code) for the dictionary D. That is, the dictionary D may be expressed as an m×p matrix as follows.

$$D = [d_1, \ldots, d_p] \in \mathbb{R}^{m \times p}$$

In this case, a column vector $D_i$ of the dictionary D may be considered as a basis vector having the same dimension m as the given signal x, and referred to as an atom.

Therefore, x is approximated to the product of the dictionary D and the sparse code (α, p×1 vector).

$$\begin{pmatrix} x_1 \\ \vdots \\ x_m \end{pmatrix} \approx (d_1 \; d_2 \; \ldots \; d_p) \begin{pmatrix} \alpha_1 \\ \alpha_2 \\ \vdots \\ \alpha_p \end{pmatrix} \quad \text{[Equation 1]}$$

In Equation 1, when p is set to a considerable number satisfying a relation of p≥m, most entries of a vectors may be set to 0, and this state may be referred to as a sparse state.

The sparse decomposition refers to an operation of calculating a sparse code (or sparse coefficient) α which expresses the input signal x as the dictionary D, when the dictionary $D=[d_1, \ldots, d_p] \in \mathbb{R}^{m \times p}$ is given.

Equation 2 is a cost function for solving a sparse decomposition problem.

$$\min_{\alpha \in R^p} \frac{1}{2} \|x - D\alpha\|_2^2 + \lambda \psi(\alpha) \quad \text{[Equation 2]}$$

In Equation 2, the first term is a data fitting term that limits a new representative value α of the signal x to as similar a value to the input signal as possible, when the new representative value α is reconstructed through the dictionary D. The second term ψ(α) is a term that sparsely limits the coefficient α. The second term ψ(α) uses two types of functions as follows:

1. $l_0$ – pseudo – norm. $\|\alpha\|_0$ @ #{i s.t α[i] ≠ 0}

2. $l_1$ – norm. $\|\alpha\|_1$ @ $\sum_{i=1}^{P} |\alpha[i]|$.

The first function $l_0$-pseudo-norm is a function for counting the number of entries which are not 0, among elements of the sparse code α. The first function measures the sparsity in the true sense of the term, but has difficulties in achieving optimization (performs optimization through OMP (Orthogonal Matching Pursuit)).

The second function $l_1$-norm is a function for adding up the absolute values of all elements of the sparse code α. The second function measures the sparsity in a loose sense of the term, but can be easily optimized as a convex function (optimized through a method referred to as Lasso).

As described above, the dictionary $D=[d_1, \ldots, d_p] \in \mathbb{R}^{m \times p}$ is required to perform the sparse decomposition.

A process of acquiring a dictionary D for given training signals (data) is referred to as dictionary learning. For dictionary learning, optimization is performed as expressed by Equation 3 below.

$$\min_{\substack{\alpha \in R^{p \times n}, \\ D \in C}} \sum_{i=1}^{n} \frac{1}{2} \|x_i - D\alpha_i\|_2^2 + \lambda \|\alpha_i\|_1, \quad \text{[Equation 3]}$$

$$C @ \{D \in R^{m \times p} \text{ s.t. } \forall j = 1, \ldots, p, \|d_j\|_2 \leq 1\}$$

The dictionary learning is an operation of finding the most suitable dictionary D for all of n training signals, and it is not easy to achieve optimization. Therefore, in the present embodiment, $l_1$-norm is used as the function of ψ(α) in Equation 2, in order to lower the complexity.

In the joint dictionary generation method in accordance with the present embodiment, training data sets each including a plurality of bases is used as learning data in order to acquire two dictionaries $D_h$ and $D_l$ which share the common sparse code α. The plurality of bases of one training data set may correspond one-to-one to the plurality of bases of the other training data set, but the bases corresponding to each other have different values.

For example, when a set $X_h$ of high-resolution signals and a set $X_l$ of low-resolution signals corresponding one-to-one to the high-resolution signals are given as the learning data where $X_l \approx L \times X_h$ and L is a coefficient, the dictionaries $D_h$ and $D_l$ sharing the sparse code α may be acquired by performing optimization as expressed in Equation 4. The learning data may correspond to image patches which are decomposed (sampled) into small sizes such as 8×8 and 7×7 from a high-resolution image frame and a low-resolution image frame, respectively.

The high-resolution signals $X_h$ may be expressed as $X_h$ and $D_h$ using the sparse code α, and the low-resolution signals $X_l$ may be expressed as ($X_l \approx L \times X_h = L \times D_h \times \alpha = D_l \times \alpha$) using the sparse code α.

The learning data (the high-resolution signals $X_h$ and the low-resolution signals $X_l$) may be subjected to sparse coding through machine learning, in order to acquire the dictionaries $D_h$ and $D_l$ and the sparse code α.

$$\min_{D_h, D_l, \alpha} \sum_{i=1}^{n} \frac{1}{2} \left\| x_i^h - D_h \alpha_i \right\|_2^2 + \frac{1}{2} \left\| x_i^l - D_l \alpha_i \right\|_2^2 + \lambda \|\alpha_i\|_1, \quad \text{[Equation 4]}$$

where $x_i^h \in X_h$, $x_i^l \in X_l$

When the dictionaries $D_h$ and $D_l$ and the sparse code α are acquired through the optimization, the basis vectors of the dictionaries $D_h$ and $D_l$ have the one-to-one correspondence relation like the elements $x^h$ and $x^l$ of the training data sets $X_h$ and $X_l$ which have the one-to-one correspondence relation, and the corresponding basis vectors have the common sparse code α. The dictionary $D_h$ becomes a dictionary for a high-resolution signal, and the dictionary $D_l$ becomes a dictionary for a low-resolution signal.

In the above-described embodiment, the resolution has been exemplified. However, other characteristics as well as the resolution may be used for the joint dictionary learning. The joint dictionary learning refers to an operation of acquiring two dictionaries (joint dictionaries) sharing a sparse code, using a set of data (training dataset) or a set of high-quality data and low-quality data. Thus, depending on the relation between the high-quality data and the low-quality data, that is, the value of the quality coefficient L, joint dictionary learning for resolution or joint dictionary learning for noise may be performed. In other words, depending on the purpose, a different training data set may be applied to acquire joint dictionaries $D_{h1}$ and $D_{l1}$ for resolution reconstruction (interlace artifact removal) or joint dictionaries $D_{h2}$ and $D_{l2}$ for noise removal.

In the present embodiment, high-quality data and low-quality data may be set to the training data set for removing interlace artifacts (resolution reconstruction). The high-quality data may be obtained through a process of sampling a predetermined number of image patches (for example, 10 thousand image patches) from a high-quality image frame of which the entire part is an actually captured image frame, and the low-quality data may be obtained through a process of generating a low-quality image frame by copying odd macro rows to even macro rows in the high-quality image frame and then sampling the same number of image patches (10 thousand image patches) from the low-quality image frame. That is, during deinterlacing, only a half region of one frame (high-exposure region or low-exposure region) is used and copied to generate a high-exposure frame or low-exposure frame. In order to convert the low-quality data obtained by copying a half of the frame into the high-quality data of which the entire part was actually captured, an image frame of which the entire part was actually captured and an image frame obtained by copying odd macro rows to even macro rows in the high-quality image frame are used to create the training data set. High-quality image patches and low-quality image patches correspond one-to-one to each other. Furthermore, the image patches are sampled to overlap each other as much as possible. For example, when the number of pixels included in the image frame is N, N 8×8 (7×7) size image patches are sampled.

In order to remove noise within a frame, image patches corresponding to the number of pixels in each of a denoised image frame without noise and a noised image frame to which AGWN (Additive Gaussian White Noise) having a specific noise variable for the denoised image frame is added may be sampled from the corresponding image frame, and used as the training data set.

In the present embodiment, the joint dictionaries $D_{h1}$ and $D_{l1}$ for removing interlace artifacts generated through the joint learning and the joint dictionaries $D_{h2}$ and $D_{l2}$ for removing noise are stored in the memory 60.

Figure 5:
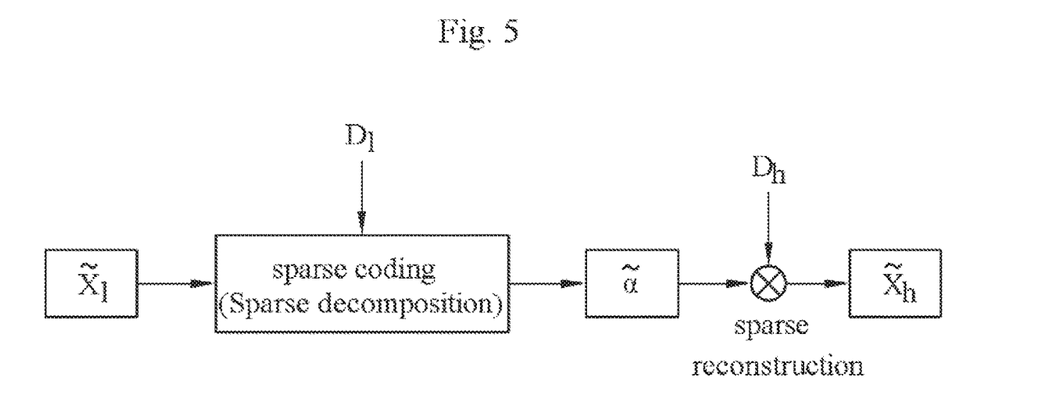
FIG. 5 is a diagram for describing a method for reconstructing a low-quality signal into a high-quality signal using the joint dictionaries acquired through the method of FIG. 4.

FIG. 5 is a diagram for describing a method for reconstructing a low-quality signal into a high-quality signal using the joint dictionaries acquired through the method of FIG. 4.

When an input low-quality (low-resolution or high-noise) signal is represented by $\tilde{X}_l$, a sparse code $\bar{\alpha}$ may be obtained by performing sparse decomposition on the low-quality signal using a joint dictionary $D_l$ for the low-quality signal $\tilde{X}_l$.

As described above, the sparse decomposition refers to an operation of calculating a sparse code for expressing an input signal as a dictionary when the dictionary is given. Therefore, when the input signal $\tilde{X}_l$ and the dictionary $D_l$ are known, the sparse code $\bar{\alpha}$ can be obtained through the sparse decomposition. The sparse code $\bar{\alpha}$ may indicate a code value which the basis vectors of the joint dictionaries $D_h$ and $D_l$ have in common.

Therefore, when a signal is sparsely reconstructed by multiplying the sparse code $\bar{\alpha}$ by the joint dictionary $D_h$ for the high-quality signal, the reconstructed signal becomes a high-quality signal $\tilde{X}_h$. This is possible because the joint dictionaries $D_h$ and $D_l$ have an one-to-one correspondence relationship.

The resolution reconstructing circuit 42 of FIG. 1 samples a preset size of images, for example, 8×8 (7×7) size images from each of the high-exposure RGB frame RGB_HE and the low-exposure RGB frame RGB_LE which are inputted from the demosaicing circuit 30. The preset size indicates an image patch size when joint learning was performed. The image patches sampled from the high-exposure RGB frame RGB_HE and the image patches sampled from the low-exposure RGB frame RGB_LE correspond one-to-one to each other. Furthermore, the image patches sampled from each of the RGB frames are sampled to overlap each other as much as possible. For example, when the number of pixels included in each of the RGB frames is N, the resolution reconstructing circuit 42 samples N 8×8 (7×7) size image patches from the RGB frame.

Then, as illustrated in FIG. 5, the resolution reconstructing circuit 42 generates a sparse code (xi by performing sparse decomposition on the image patches sampled from the high-exposure RGB frame RGB_HE and the low-exposure RGB frame RGB_LE, using the low-resolution joint dictionary al stored in the memory 60. Then, the resolution reconstructing circuit 42 generates high-resolution image patches by performing sparse reconstruction to multiply the generated sparse code $\alpha_1$ by the high-resolution joint dictionary $D_{h1}$ stored in the memory 60, and then combines the high-resolution image patches to generate a high-exposure RGB frame RA_RGB_HE and low-exposure RGB frame RA_RGB_LE from which the interlace artifacts are removed.

The first denoising circuit 44 in FIG. 1 removes noise contained in each of the high-exposure RGB frame RA_RGB_HE and the low-exposure RGB frame RA_RGB_LE outputted from the resolution reconstructing circuit 42, using the noise-removal joint dictionaries $D_{h2}$ and $D_{l2}$ stored in the memory 60.

For this operation, the first denoising circuit 44 samples a preset size of image patches, for example, 8×8 or 7×7 size images from the high-exposure RGB frame RA_RGB_HE and the low-exposure RGB frame RA_RGB_LE which are inputted from the resolution reconstructing circuit 42. For example, the first denoising circuit 44 may sample the image patches in the same manner as the resolution reconstructing circuit 42 samples the image patches.

The first denoising circuit 44 generates a sparse code $\alpha_2$ by performing sparse decomposition on the sampled image patches, using the high-noise joint dictionary $D_{l2}$ stored in the memory 60. Then, the first denoising circuit 44 generates denoised image patches by performing sparse reconstruction to multiply the generated sparse code $\alpha_2$ by the low-noise joint dictionary $D_{h2}$ stored in the memory 60, and then combines the denoised image patches to generate a denoised high-exposure RGB frame RNA_RGB_HE and low-exposure RGB frame RNA_RGB_LE.

In the present embodiment, it has been described that the resolution reconstructing circuit 42 generates high-resolution image patches from which interlace artifacts are removed, generates the high-exposure RGB frame RA_RGB_HE and the low-exposure frame RA_RGB_LE by combining the generated image patches, and outputs the high-exposure RGB frame RA_RGB_HE and the low-exposure RA_RGB_LE. However, the resolution reconstructing circuit 42 may directly output high-resolution image patches. In this case, the first denoising circuit 44 may generate denoised image patches by performing sparse decomposition and sparse reconstruction on the high-resolution image patches inputted from the resolution reconstructing circuit 42, using the noise-removal joint dictionaries $D_{h2}$ and $D_{l2}$, and combine the generated image patches to generate the denoised high-exposure RGB frame RNA_RGB_HE and low-exposure RGB frame RNA_RGB_LE with high resolution.

In the present embodiment, it has been described that the resolutions of the frames are reconstructed and noise is removed from the resolution-reconstructed frames. However, the operation sequence may be changed. That is, the noise removal for the high-exposure RGB frame RGB_HE and the low-exposure RGB frame RGB_LE may be performed, and the resolution reconstruction for the high-exposure RGB frame RGB_HE and the low-exposure RGB frame RGB_LE may be then performed.

Figure 6:
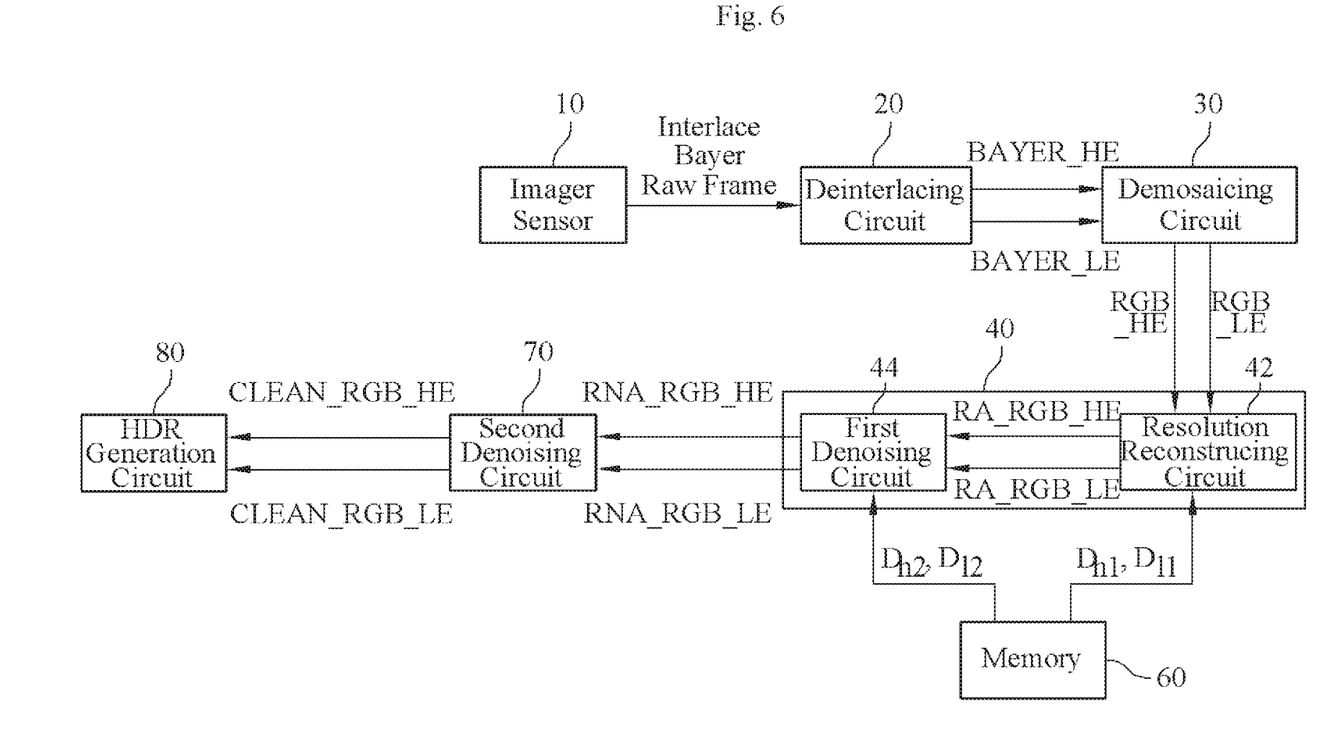
FIG. 6 illustrates a configuration of an interlace-based HDR imaging apparatus in accordance with another embodiment.

FIG. 6 illustrates a configuration of an interlace-based HDR imaging apparatus in accordance with another embodiment.

The first denoising circuit 44 in the embodiment of FIG. 1 serves to remove noise in each frame. However, when an input signal is a moving image signal, spatial denoising in a frame as well as temporal denoising between consecutive image frames may be performed at the same time.

Therefore, the HDR imaging apparatus in accordance with the present embodiment further includes a second denoising circuit 70 installed at an output terminal of the first denoising circuit 44 and configured to remove noise between frames, in addition to the configuration of FIG. 1.

The second denoising circuit 70 removes noise between high-exposure RGB frames RNA_RGB_LE which are consecutively outputted from the first denoising circuit 44 and noise between low-exposure RGB frames RNA_RGB_LE which are consecutively outputted from the first denoising circuit 44. As for the method for removing noise between consecutive frames, the second denoising circuit 70 may use a temporal denoising method using multiscale homography.

Figure 7:
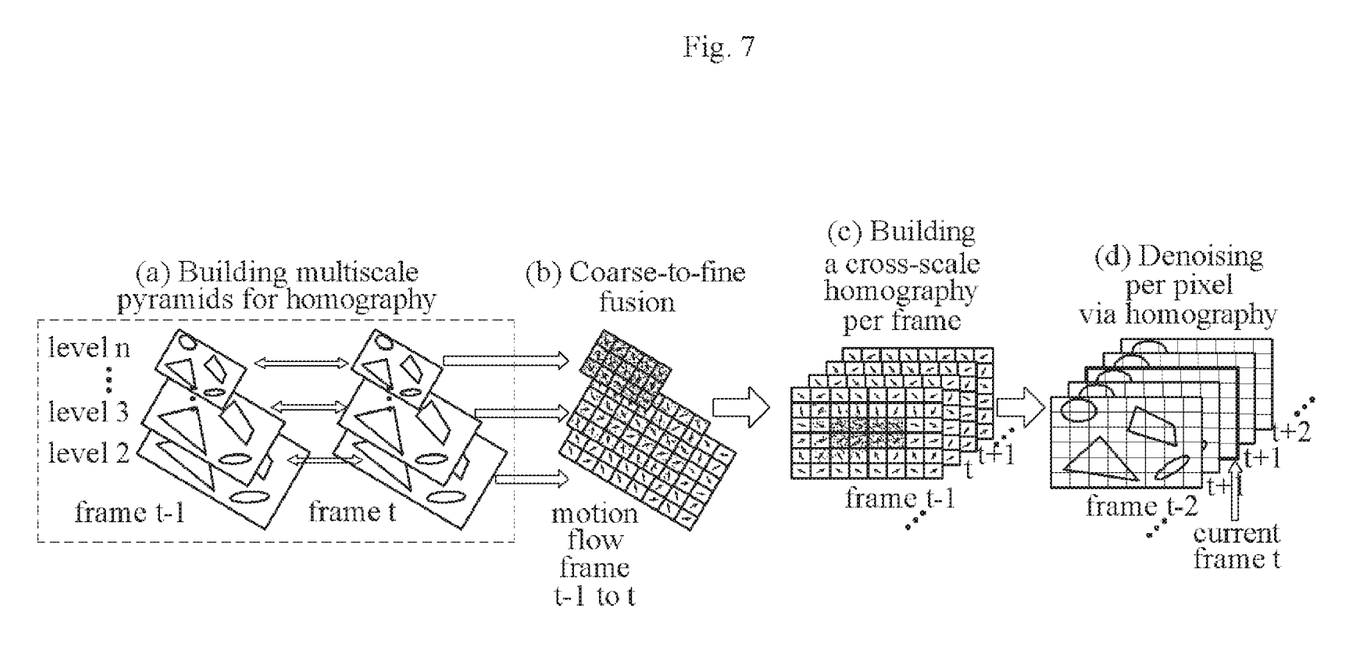
FIG. 7 is diagram for describing a temporal denoising method using a multiscale homography.

FIG. 7 is diagram for describing the temporal denoising method using multiscale homography.

First, as illustrated in FIG. 7(a)A, Gaussian pyramids are built for each frame by expressing one image at different scales (resolutions), and homography (motion) between adjacent Gaussian pyramids is estimated to form multiscale homography pyramids for consecutive frames t−1 and t. That is, the multiscale homograph pyramids indicating a motion flow for each scale between the adjacent Gaussian pyramids are formed as illustrated in FIG. 7(b). A large scale in the multiscale homography pyramids of FIG. 7(b) describes a small motion. That is, the homography found at the lowest level (level h) of scale describes the largest motion, and the homography found at the highest level (level 1) of scale describes the smallest motion.

Then, the images for the respective levels in each of the multiscale homography pyramids are warped to set all levels to the same scale, and a coarse-to-fine method is applied to combine the whole levels for each pixel. Thus, as illustrated in FIG. 7(c), cross-scale homography flow maps for the respective frames t−1, t and t+1 are formed. That is, the optimal motion for each pixel in each of the frames can be estimated.

When the cross-scale homography flow maps are formed for the whole frames through such a method, motions can be tracked for the respective pixels in consecutive frames, and the average value of the tracked motions can be acquired.

In such a process, pixels of which the intensity differences from a target value are equal to or less than a threshold value may be sorted out, and the average value may be applied to the pixels, in order to remove noise between the frames as shown FIG. 7(d).

As described above, the second denoising circuit 70 of FIG. 6 removes noise between consecutive frames for high-exposure frames and low-exposure frame, using the multiscale homography flow.

The HDR generation circuit 80 generates an HDR image by combining a high-exposure RGB frame CLEAN_RGB_HE and a low-exposure RGB frame CLEAN_RGB_LE which are outputted from the second denoising circuit 70. That is, the HDR generation circuit 80 generates the HDR image by combining the high-exposure RGB frame CLEAN_RGB_HE and the low-exposure RGB frame CLEAN_RGB_LE from which interlace artifacts, noise in the frames and noise between the frames are removed.

Figure 8:
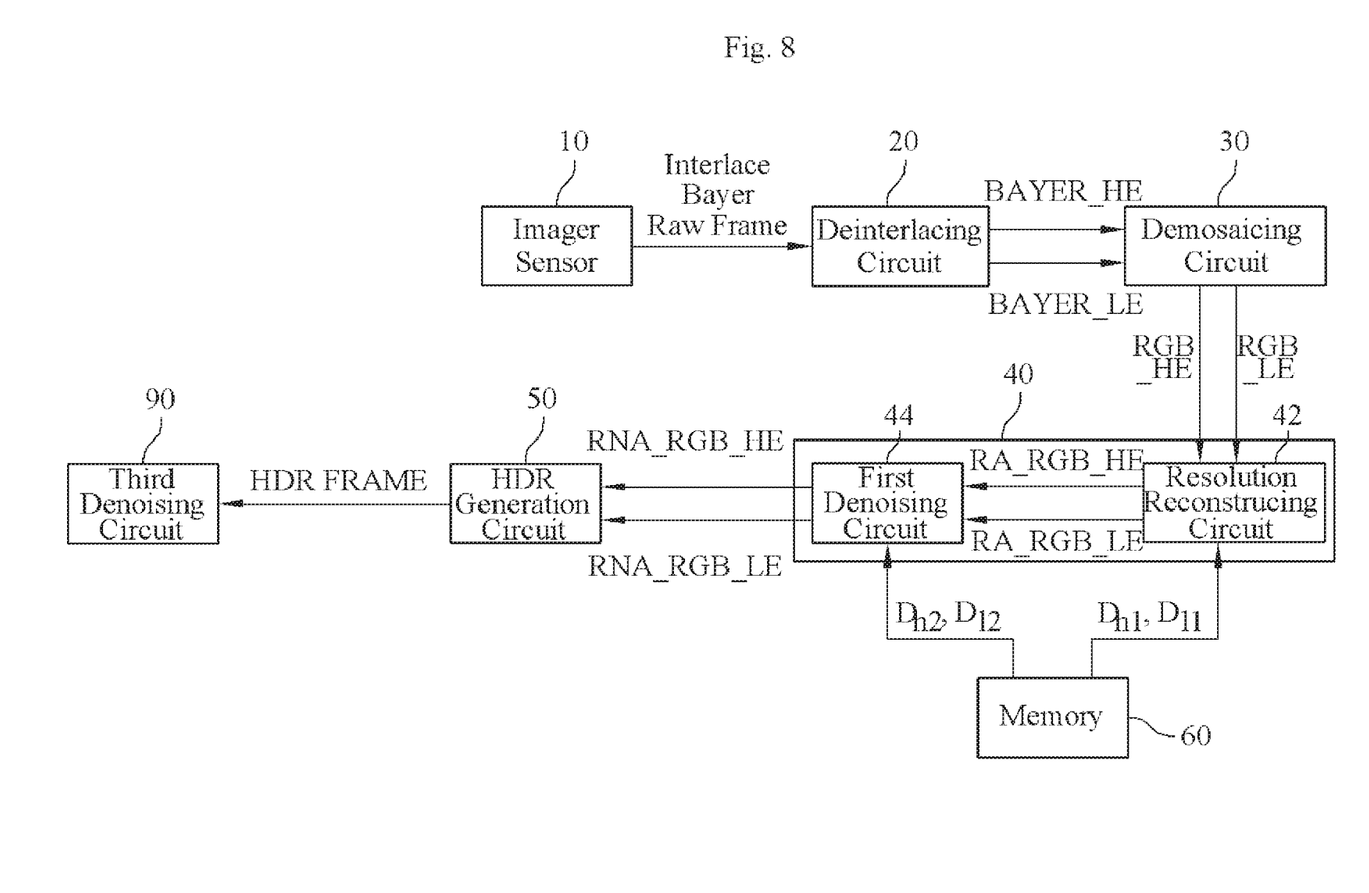
FIG. 8 illustrates a configuration of an interlace-based HDR imaging apparatus in accordance with an embodiment.

FIG. 8 illustrates a configuration of an interlace-based HDR imaging apparatus in accordance with still another embodiment.

In the embodiment of FIG. 6, it has been described that the noise removal between frames is performed before the HDR image is generated. However, the noise removal between frames may be performed on the HDR image frames.

That is, unlike the configuration of FIG. 6, the interlace-based HDR imaging apparatus in accordance with the present embodiment further includes a third denoising circuit 90 installed at an output terminal of the HDR generation circuit 50 so as to remove noise between frames, in addition to the configuration of FIG. 1.

The third denoising circuit 90 removes noise between HDR image frames generated by the HDR generation circuit 50. The method for removing noise between consecutive HDR image frames may be performed in the same manner as the method performed by the second denoising circuit 70.

In accordance with the embodiments, it is possible to solve the resolution and noise problems which may occur while processing an interlace-based HDR image, thereby maximizing the quality of the HDR image.

Although various embodiments have been described for illustrative purposes, it will be apparent to those skilled in the art that various changes and modifications may be made without departing from the spirit and scope of the invention as defined in the following claims.

What is claimed is:

1. A joint dictionary generation method for image processing, comprising:
   receiving first data as a set of first bases with a high resolution;
   receiving second data as a set of second bases with a low resolution; and
   generating a high-quality joint dictionary and low-quality joint dictionary which share a specific sparse code, by performing sparse coding on the first and second data,
   wherein the first bases and the second bases correspond one-to-one to each other,
   wherein the first data comprises image patches sampled from a first image frame which was captured, and the second data comprises image patches sampled from a second image frame generated by adding interlace artifacts or noise to the first image frame, and
   wherein the second image frame is generated by copying odd macro rows into even macro rows in the first image frame or by adding AGWN (Additive Gaussian White Noise) having a specific variable to the first image frame.

2. The joint dictionary generation method of claim 1, wherein the generating of the high-quality joint dictionary and the low-quality joint dictionary comprises performing optimization on the first and second data $X_h$ and $X_l$ according to the following equation:

$$\min_{D_h,D_l,\alpha} \sum_{i=1}^{n} \frac{1}{2}\|x_i^h - D_h\alpha_i\|_2^2 + \frac{1}{2}\|x_i^l - D_l\alpha_i\|_2^2 + \lambda\|\alpha_i\|_1,$$

where $X^h$ represents a signal value contained in the first data $X_h$, $x^l$ represents a signal value contained in the second data $X_l$, $D_h$ represents the high-quality joint dictionary, $D_l$ represents the low-quality joint dictionary, and a represents the sparse code shared by $D_h$ and $D_l$.

3. An HDR (High Dynamic Range) imaging apparatus comprising:
 a reconstructing circuit configured to remove interlace artifacts and noise from a high-exposure RGB frame and a low-exposure RGB frame, using joint dictionaries generated through joint dictionary learning on training data sets each containing a plurality of bases, wherein the plurality of bases of one training data set correspond one-to-one to those of the other training data set, but the corresponding bases have different values; and
 an HDR generation circuit configured to generate an HDR image frame by combining the high-exposure RGB frame and the low-exposure RGB frame from which interlace artifacts and noise were removed by the reconstructing circuit.

4. The HDR imaging apparatus of claim 3, further comprising a deinterlacing circuit configured to generate a high-exposure Bayer frame and low-exposure Bayer frame by deinterlacing an interlace Bayer raw frame in which a high-exposure region and low-exposure region are interlaced;
 a demosaicing circuit configured to convert the high-exposure Bayer frame and the low-exposure Bayer frame into the high-exposure RGB frame and the low-exposure RGB frame, respectively; and
 a memory configured to store the joint dictionaries.

5. The HDR imaging apparatus of claim 3, wherein the reconstructing circuit comprises:
 a resolution reconstructing circuit configured to remove interlace artifacts from the high-exposure RGB frame and the low-exposure RGB frame, using a high-resolution joint dictionary and low-resolution joint dictionary which share a first sparse code; and
 a first denoising circuit configured to remove noise contained in the high-exposure RGB frame and the low-exposure RGB frame, using a high-noise joint dictionary and low-noise joint dictionary which share a second sparse code.

6. The HDR imaging apparatus of claim 5, wherein the resolution reconstructing circuit samples image patches from the high-exposure RGB frame and the low-exposure RGB frame, acquires the first sparse code by performing sparse decomposition using the low-resolution joint dictionary on the sampled image patches, and removes interlace artifacts contained in the corresponding image patches by multiplying the acquired first sparse code by the high-resolution joint dictionary.

7. The HDR imaging apparatus of claim 6, wherein the resolution reconstructing circuit samples an equal number of image patches to the number of pixels included in each of the high-exposure RGB frame and the low-exposure RGB frame.

8. The HDR imaging apparatus of claim 6, wherein the first denoising circuit acquires the second sparse code by performing sparse decomposition using the high-noise joint dictionary on the image patches from which interlace artifacts were removed by the resolution reconstructing circuit, and removes noise contained in the corresponding image patches by multiplying the acquired second sparse code by the low-noise joint dictionary.

9. The HDR imaging apparatus of claim 5, wherein the first denoising circuit samples image patches from the high-exposure RGB frame and the low-exposure RGB frame, acquires the second sparse code by performing sparse decomposition using the high-noise joint dictionary on the sampled image patches, and removes noise contained in the corresponding image patches by multiplying the acquired second sparse code by the low-noise joint dictionary.

10. The HDR imaging apparatus of claim 9, wherein the first denoising circuit samples an equal number of image patches to the number of pixels included in each of the high-exposure RGB frame and the low-exposure RGB frame.

11. The HDR imaging apparatus of claim 3, further comprising a second denoising circuit configured to remove noise between frames for high-exposure RGB frames and low-exposure RGB frames which are outputted from the reconstructing circuit, using a multiscale homography flow for the high-exposure RGB frames and the low-exposure RGB frames.

12. The HDR imaging apparatus of claim 3, further comprising a third denoising circuit configured to remove noise between the HDR image frames using a multiscale homography flow for the HDR mage frames generated by the HDR generation circuit.

13. An HDR image processing method comprising:
 removing interlace artifacts and noise from a high-exposure RGB frame and a low-exposure RGB frame, by using joint dictionaries generated through joint dictionary learning on training data sets each containing a plurality of bases, wherein the plurality of bases of one training data set correspond one-to-one to those of the other training data set, but the corresponding bases have different values; and
 generating an HDR image frame by combining the high-exposure RGB frame and the low-exposure RGB frame from which interlace artifacts and noise are removed.

14. The HDR image processing method of claim 13, further comprising:
 generating a high-exposure Bayer frame and low-exposure Bayer frame using an interlace Bayer raw frame in which a high-exposure region and low-exposure region are interlaced; and
 converting the high-exposure Bayer frame and the low-exposure Bayer frame into a high-exposure RGB frame and a low-exposure RGB frame, respectively.

15. The HDR image processing method of claim 13, wherein the generating of the joint dictionaries comprises:
 generating a high-resolution joint dictionary and low-resolution joint dictionary which share a first sparse code, by performing sparse coding on first bases with a first resolution and second bases with a second resolution lower than the first resolution, the second bases corresponding one-to-one to the first bases; and
 generating a high-noise joint dictionary and low-noise joint dictionary which share a second sparse code, by performing sparse coding on third bases having first noise and fourth bases having second noise smaller than the first noise, the fourth bases corresponding one-to-one to the third bases.

16. The HDR image processing method of claim 15, wherein the removing of interlace artifacts and noise comprises:

removing interlace artifacts from the high-exposure RGB frame and the low-exposure RGB frame, using the high-resolution joint dictionary and the low-resolution joint dictionary; and first removing noise contained in the high-exposure RGB frame and the low-exposure RGB frame, using the high-noise joint dictionary and the low-noise joint dictionary.

17. The HDR image processing method of claim 16, wherein the first removing of interlace artifacts and noise comprises sampling image patches from the high-exposure RGB frame and the low-exposure RGB frame, acquiring the first sparse code by performing sparse decomposition using the low-resolution joint dictionary on the sampled image patches, and removing interlace artifacts contained in the corresponding image patches by multiplying the acquired first sparse code by the high-resolution joint dictionary.

18. The HDR image processing method of claim 17, wherein the first-removing of noise comprises acquiring the second sparse code by performing sparse decomposition using the high-noise joint dictionary on the image patches from which interlace artifacts were removed through the resolution reconstructing step, and removing noise contained in the corresponding image patches by multiplying the acquired second sparse code by the low-noise joint dictionary.

19. The HDR image processing method of claim 16, wherein the first-removing of noise comprises sampling image patches from the high-exposure RGB frame and the low-exposure RGB frame, acquiring the second sparse code by performing sparse decomposition using the high-noise joint dictionary on the sampled image patches, and removing noise contained in the corresponding image patches by multiplying the acquired second sparse code by the low-noise joint dictionary.

20. The HDR image processing method of claim 13, further comprising second-removing noise between frames for high-exposure RGB frames and low-exposure RGB frames from which interlace artifacts and noise were removed through the reconstructing step, using a multiscale homography flow for the high-exposure RGB frames and the low-exposure RGB frames.

21. The HDR image processing method of claim 13, further comprising third-removing noise between the HDR image frames, using a multiscale homography flow for the HDR image frames.

* * * * *